Jan. 1, 1952     J. A. GALAMB     2,581,183
FOWL-PICKING APPARATUS
Filed Sept. 26, 1947     3 Sheets—Sheet 1
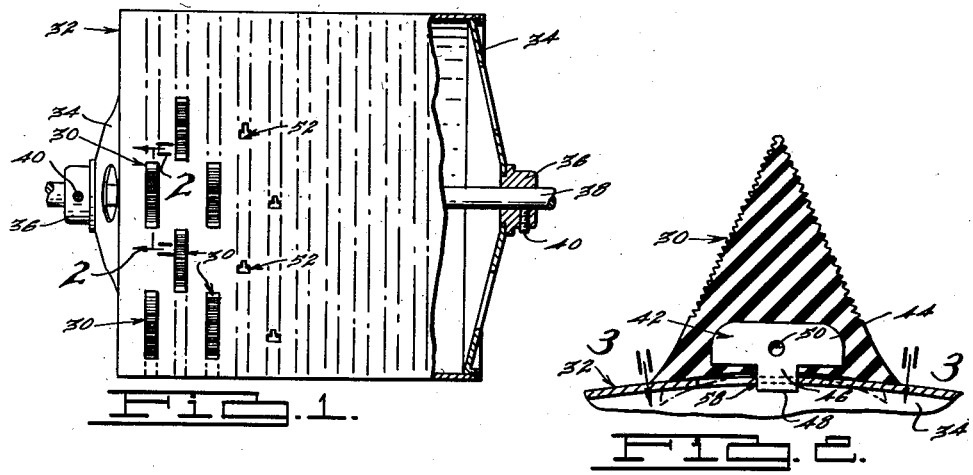
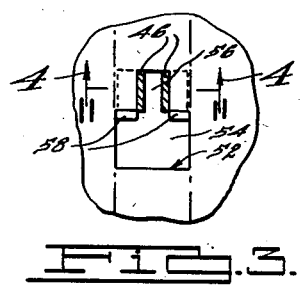
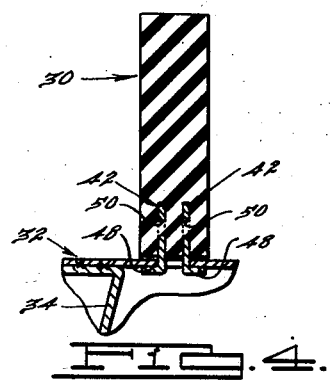
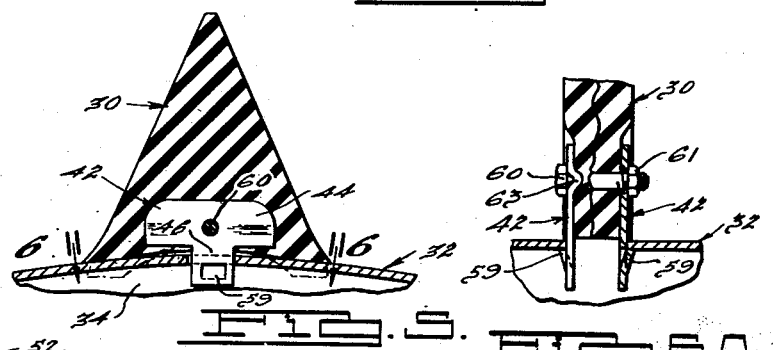
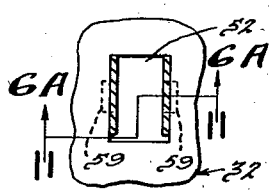
INVENTOR.
Joseph A. Galamb.
BY
Harness, Dickey & Pierce.
ATTORNEYS.

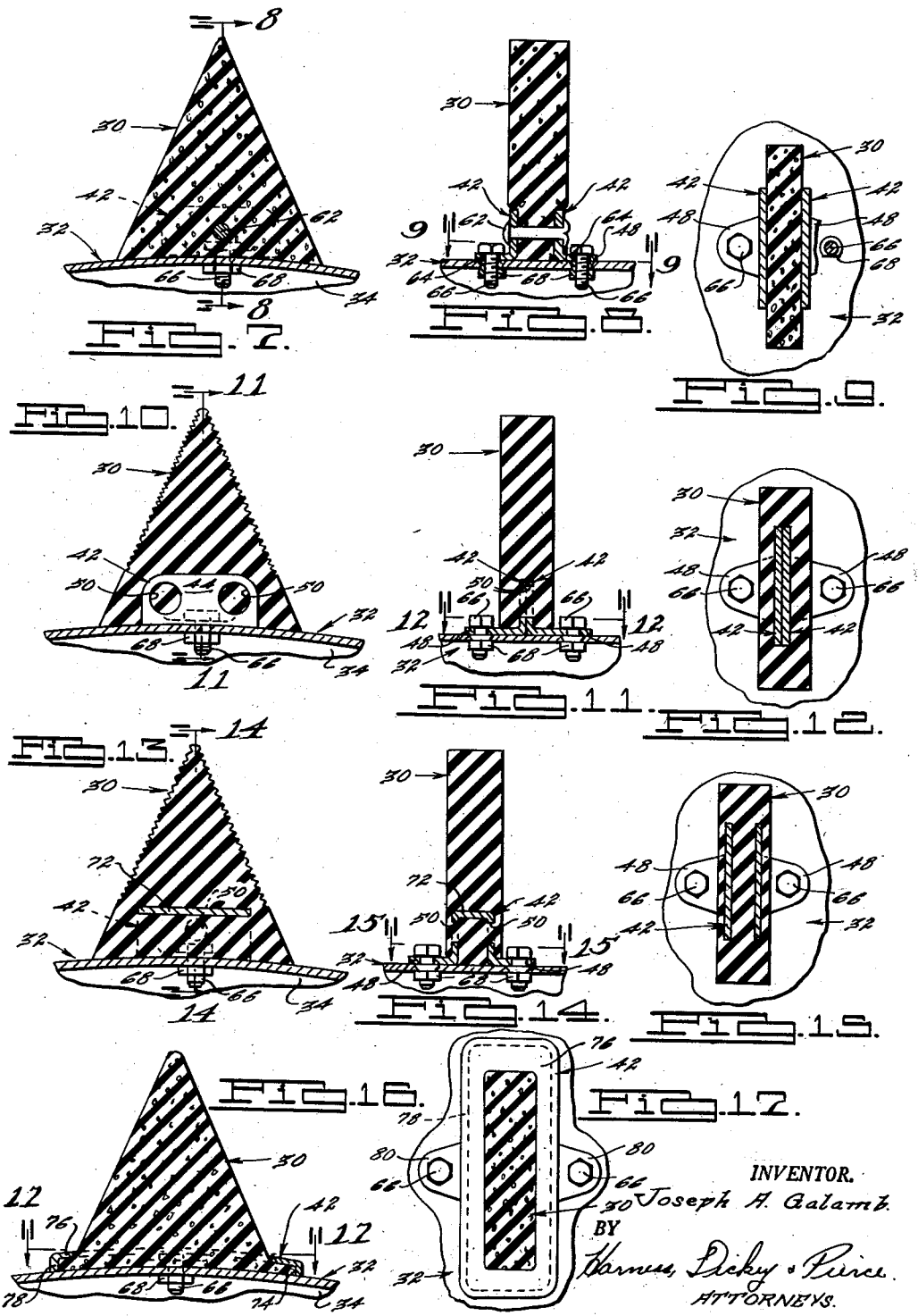

Jan. 1, 1952 J. A. GALAMB 2,581,183
FOWL-PICKING APPARATUS
Filed Sept. 26, 1947 3 Sheets-Sheet 3

INVENTOR.
Joseph A. Galamb
BY
Harness, Dickey & Pierce
ATTORNEYS

Patented Jan. 1, 1952

2,581,183

UNITED STATES PATENT OFFICE 2,581,183

FOWL-PICKING APPARATUS

Joseph A. Galamb, Detroit, Mich., assignor to Fred Hanshaw, Port Huron, Mich.

Application September 26, 1947, Serial No. 776,279

3 Claims. (Cl. 17—11.1)

1

This invention relates broadly to new and useful improvements in fowl picking apparatus of the type wherein feather picking teeth of rubber or the like are mounted on a rotatable drum and more particularly to novel means for mounting the teeth on the drum.

An important object of the present invention is to provide improved mountings for fastening the feather picking teeth individually on the drum.

Another object of the invention is to provide mountings of the above mentioned character which hold the teeth attached solidly to the drum but permit ready disengagement thereof for repair or replacement.

Still another object of the invention is to provide mountings of the above mentioned character which are mechanically simple and relatively inexpensive to manufacture.

Other objects and advantages of the invention will be apparent during the course of the following description.

In the drawings forming a part of this specification and wherein like numerals are employed to designate like parts throughout the same:

Fig. 1 is a plan view showing a plurality of feather picking teeth attached to a rotatable drum by mountings embodying the present invention;

Fig. 2 is an enlarged fragmentary transverse sectional view taken on the line 2—2 of Fig. 1;

Fig. 3 is a fragmentary, horizontal sectional view taken on the line 3—3 of Fig. 2;

Fig. 4 is a fragmentary, longitudinal sectional view taken on the line 4—4 of Fig. 3;

Fig. 5 is a fragmentary, transverse sectional view similar to Fig. 2 but showing a modified mounting for the tooth;

Fig. 6 is a fragmentary, horizontal sectional view taken on the line 6—6 of Fig. 5;

Fig. 6A is a fragmentary, vertical sectional view taken on the line 6A—6A of Fig. 6;

Fig. 7 is a fragmentary, transverse sectional view similar to Fig. 5 but showing another type of mounting for the tooth;

Fig. 8 is a fragmentary, longitudinal sectional view taken on the line 8—8 of Fig. 7;

Fig. 9 is a fragmentary, horizontal sectional view taken on the line 9—9 of Fig. 8;

Fig. 10 is a fragmentary, transverse sectional view showing still another type of mounting embodying the invention;

Fig. 11 is a fragmentary, longitudinal sectional view taken on the line 11—11 of Fig. 10;

Fig. 12 is a fragmentary, horizontal sectional view taken on the line 12—12 of Fig. 11;

2

Figure 18:
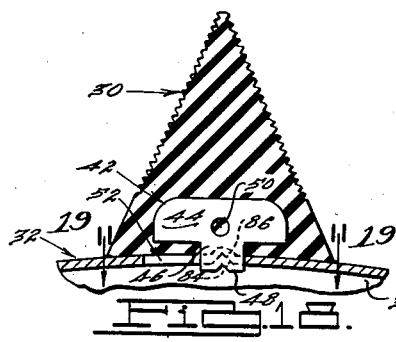
Figure 19:
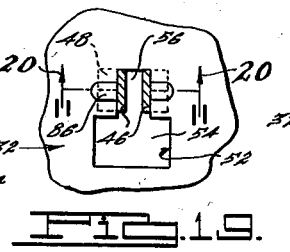
Figure 20:
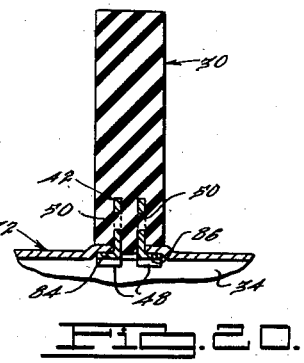
Figure 21:
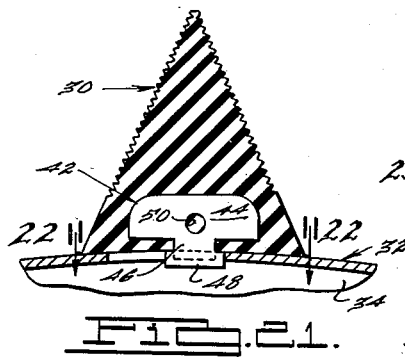
Figure 22:
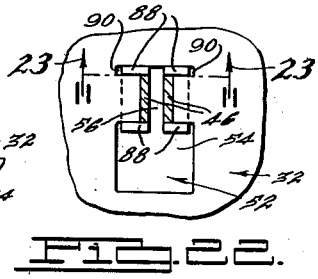
Figure 23:
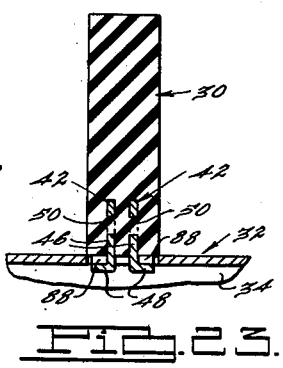
Figure 24:
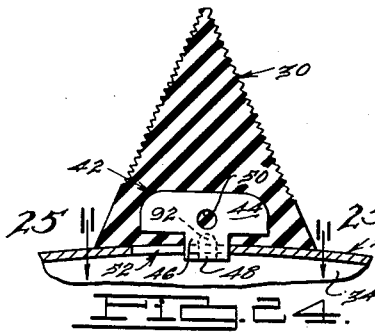
Figure 25:
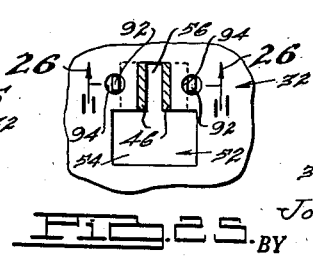
Figure 26:
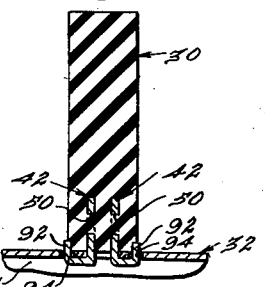

Fig. 13 is a fragmentary, transverse sectional view showing still another type of mounting embodying the invention;

Fig. 14 is a fragmentary, longitudinal sectional view taken on the line 14—14 of Fig. 13;

Fig. 15 is a fragmentary, horizontal sectional view taken on the line 15—15 of Fig. 14;

Fig. 16 is a fragmentary, transverse sectional view showing still another type of mounting for fastening the teeth on the drum;

Fig. 17 is a fragmentary, horizontal sectional view taken on the line 17—17 of Fig. 16;

Fig. 18 is a fragmentary, transverse sectional view showing still another mounting embodying the invention;

Fig. 19 is a fragmentary, horizontal sectional view taken on the line 19—19 of Fig. 18;

Fig. 20 is a fragmentary, longitudinal sectional view taken on the line 20—20 of Fig. 19;

Fig. 21 is a fragmentary, transverse sectional view showing a modified form of the invention and illustrating still another type of mounting embodying the invention;

Fig. 22 is a fragmentary, horizontal sectional view taken on the line 22—22 of Fig. 21;

Fig. 23 is a fragmentary, longitudinal sectional view taken on the line 23—23 of Fig. 22;

Fig. 24 is a fragmentary, transverse sectional view showing still another modified type of mounting embodying the invention;

Fig. 25 is a fragmentary, horizontal sectional view taken on the line 25—25 of Fig. 24; and Fig. 26 is a fragmentary, longitudinal sectional view taken on the line 26—26 of Fig. 25.

Broadly, the mountings embodying the present invention can be used on any type of feather picking apparatus or in any capacity where devices of this character have utility. However, the mountings are primarily adapted and preeminently suited for use in connection with fowl picking apparatus of the type disclosed in the Hanshaw Patent 2,314,700.

In this connection, I propose to mount a plurality of rubber, feather picking teeth 30 on the periphery of a metal drum 32. This drum 32 may be of any desired length and the ends 34 thereof are provided with centrally located, fixed collars 36 which receive an axial drive shaft 38. Set screws 40 fasten collars 36 to the drive shaft 38, and drum 32 rotates with the shaft which may be rotatably driven in any suitable manner. Conveniently, the drum 32 can be mounted in an apparatus of the type disclosed in the Hanshaw patent hereinabove referred to and driven in the manner therein disclosed.

As shown in Fig. 1, the teeth 30 are mounted on and project radially from the periphery of the drum 32, and they preferably are arranged in rows with the teeth in adjacent rows disposed in staggered relation for maximum efficiency of operation. The teeth 30 here shown are generally triangular in side elevation so as to be increasingly flexible toward the tip thereof and are formed with flat, front and rear edge surfaces. These latter surfaces engage the fowl during rotation of the drum and remove the feathers therefrom. As shown in the drawing, the teeth 30 are of rubber and either hard or sponge rubber may be used. In certain of the mountings hereinafter described, brackets are embedded in the body of the teeth; and, in these instances, the teeth preferably are made of hard rubber so that they can be vulcanized to the brackets for added strength. In other of the mountings, brackets are bolted, riveted or otherwise fastened on the outside of the teeth; and, in these instances, the teeth conveniently can be made of sponge rubber. It is to be understood, however, that either hard or sponge rubber can be employed in the latter construction. As a general proposition, sponge rubber is preferred since it is softer and less likely to bruise or otherwise injure the fingers during operation of the apparatus; moreover, by reason of the porous, cellular construction of sponge rubber, it is considerably more efficient in operation.

In the form of the invention shown in Figs. 2–4, a pair of mounting brackets 42 is associated with each tooth 30, which brackets conveniently can be made from sheet metal by conventional stamping and forming operations. Each bracket 42 has an upper, horizontally elongated portion 44 which is embedded in the base portion of the tooth 30 and a medianly located, relatively narrow, depending portion 46 which projects through and below the bottom surface of the tooth. On the lower edge of the depending portion 46 is an integral, laterally extending flange 48; and, it will be observed (Fig. 4), that the two brackets 42 are fastened in the tooth with the flanges 48 extending laterally outwardly with respect thereto and in opposite directions with respect to each other. Preferably, the upper portions 44 are perforated, as at 50, so that portions of the teeth at opposite sides of the brackets are integrally united through the perforations when the teeth are vulcanized thereto.

The drum 32 is provided with a generally T-shaped opening 52 for each tooth 30 (Fig. 3). The relatively large portions 54 of openings 52 are shaped to permit the bottom flanges of the mounting brackets 42 to be inserted downwardly therethrough to a position under the drum 32, and the relatively small portions 56 of openings 52 are just wide enough to accommodate the depending bracket portions 46. Each tooth 30 is mounted on the drum 32 by inserting flanges 48 downwardly through the large opening 54 and then sliding the tooth circumferentially on the drum to move the depending portions 46 into the relatively small opening 52 and to engage the flanges under the drum at opposite sides of the latter opening. In this connection, it will be observed that the portions of drum 32 at opposite sides of the small opening 56 and adjacent to the large opening 54 are bent downwardly to define stops or abutments 58 which engage the flanges 48 to prevent inadvertent reverse movement of the tooth and to hold the latter fixed to the drum.

In order to enhance the efficacy of the mounting hereinabove described, the bottom surface of each tooth 30 normally is concave as shown by broken lines in Fig. 2, and it is necessary to compress the tooth against the surface of the drum 32 in order to insert flanges 48 downwardly through opening 54 and under the stops 58. It will be observed that the stops 58 extend generally in the plane of the drum and partially across the opening 54. The surfaces of stops 58 adjacent the relatively large portion of the opening 54 are shaped to provide cam surfaces which engage the mounting brackets when the latter are moved from the relatively large portion to the relatively small portion of the opening, and the edges of the stops adjacent the relatively small portion of the opening define shoulders which engage the mounting bracket to hold the same normally in the relatively small portion of the opening. After flanges 48 have been moved past the stops 58 in the manner hereinabove described, the resilient action of the compressed tooth 30 against the drum 32 holds the flanges 48 pressed solidly upwardly against the drum and assists the stops 58 in preventing inadvertent reverse movement of the tooth.

Any tooth 30 can be individually removed merely by forcing it downwardly against the periphery of the drum sufficiently to disengage the flanges 48 from stops 58. The tooth can then be retracted; and, as soon as flanges 58 enter the relatively large opening 54, the tooth can be easily lifted from the drum. It is of particular significance that, in this and other forms of the invention herein described, each tooth is separably removable from the drum independently of the other teeth and each tooth can be either attached or removed without loosening or otherwise affecting any of the other teeth. Thus, any tooth can be replaced easily and quickly. In addition, the means for fastening the teeth on the drum can be made easily and inexpensively since brackets 42 can be made in large quantities by automatic stamping and forming operations. Also, openings 52 and stops 58 can be formed in the drum 32 simultaneously by a single stamping operation. In this connection, it will be readily apparent that the openings 52 preferably are made in the strip of sheet metal before the same is rolled and formed into a drum.

The form of the invention shown in Figs. 5, 6, and 6A has a mounting bracket 42 of modified construction, and the bracket is mounted in a differently shaped opening 52 in the drum 32. As shown in the drawing, each of the modified mounting brackets 42 has an elongated upper portion 44 similarly to the brackets hereinabove described, but the lateral flange 48 is omitted and the depending median portion 46 is relatively elongated to extend a substantial distance into the drum 32. A tongue 59 is struck outwardly from the depending portion 46, which tongue is attached at the lower edge thereof and inclines outwardly and upwardly from the attached edge.

In the form of the invention here shown, two brackets 42 are provided at opposite sides of the tooth 30 with the upper tooth-engaging portions 44 against the sides of the tooth. A cap screw 60 extends through the openings 50 and through the body of the tooth 30, and a nut 61 on the screw 60 holds the brackets fastened securely to the tooth 30. Preferably the bracket portions 44 are provided at opposite sides of the openings 50 with inwardly directed ridges 63 which conveniently can be pressed directly from the material of the bracket by a conventional stamping and forming operation. These ridges 63 bite into the body of the tooth when the nut 61 is tightened and assist in holding the mounting brackets in fixed association with the tooth.

In this form of the invention, the drum openings 52 are generally rectangular in form (Fig. 6), and each opening 52 is just large enough to accommodate the depending bracket portion 46 of a respective tooth assembly. Thus, the openings 52 are only slightly longer than the width of bracket portions 46 and are just sufficiently wide to accommodate the two mounting brackets on opposite sides of the tooth 30. This size and shape of opening has the advantage that the preformed sheet of metal from which the drum is fashioned can be more easily bent into a true circular shape. Apparently, this is due to the fact that less metal is removed than when the openings are shaped as shown in the first form of the invention. If desired, mounting brackets 42 may be embedded in and vulcanized to the tooth 30 in the manner described in connection with the first form of the invention, and it will be readily apparent that, if the brackets are attached to the tooth in this manner, the openings 52 should be correspondingly narrower.

In use, each tooth 30 is applied to the drum merely by inserting the extending portions 46 of the associated mounting brackets 42 downwardly into an opening 52 and applying sufficient pressure downwardly against the tooth to force the tongues 59 through the opening and to a position below the tongue as shown in Fig. 6A. In this connection, it will be readily apparent that the tongues 59 are yieldable and will have at least some resiliency and that, in addition, the rubber body of the tooth 30 will yield somewhat when the tongues are forced through the opening 52. If desired, the opening 52 may be made slightly narrower than the normal spacing between the brackets 42 so that the body of the tooth must be compressed slightly in order to insert the bracket into the opening. When this relationship exists between the parts, the compressed tooth reacts against the bracket to force the same outwardly against the sides of opening 52 and thus assists in holding the tongues 59 in interlocking engagement with the drum. To remove the tooth 30, the two brackets are grasped between the jaws of a suitably constructed plier at a point immediately above the surface of the drum 32 and pressure is applied against such plier to squeeze the brackets inwardly sufficiently to release the tongues 59 from the drum.

In view of the foregoing it will be readily apparent that each tooth 30 is held securely on the drum at all times and that each tooth can be independently attached to or removed from the drum easily and expeditiously.

Reference is now had to Figs. 7, 8, and 9 which show modified means for attaching the teeth 30 to the drum 32. In this form of the invention, a pair of brackets 42 similar to those hereinabove described are attached at opposite sides of each tooth 30 by a rivet 62 or the like. Preferably, the rivet 62 holds the brackets 42 tightly against and at least partially embedded in the tooth 30 as shown in Fig. 8. The flanges 48 are provided with openings 64, and cap screws 66 extend through the openings and are threaded into clincher nuts 68 which are fastened in the drum in the conventional manner. Experience teaches that one cap screw 66 at each side of the tooth 30 will hold the latter solidly on the drum 32; and in this form of the invention, it is merely necessary to unscrew these two elements in order to remove any tooth 30 from the drum.

The form of the invention shown in Figs. 10-12 is similar to the one just described except that the upper portions 44 of flanges 42 are embedded in the base portion of the tooth 30 and vulcanized thereto in the manner described in connection with the form of the invention first described. Also the bracket portions 44 are provided with perforations 50 for obvious reasons. The portions 44 may be embedded in the tooth 30 in any desired manner; and for purposes of illustration are shown together, side by side, in the middle of the tooth (Fig. 11).

The form of the invention shown in Figs. 13-15 is similar to the one shown in Figs. 10-12 except that the two brackets 42 are formed as a single unit and are connected at the upper edges thereof by an integral transverse web 72. It will be observed that, in this form of the invention, the two portions 44 of the brackets 42 are spaced apart in the body of the tooth 30.

In the form of the invention shown in Figs. 16 and 17, each tooth 30 is formed with an integral laterally projecting flange 74 which extends entirely around the base portion thereof and flatly engages the periphery of the drum 32 (Fig. 16). The retaining bracket for holding the tooth 30 on the drum 32 comprises a generally rectangular frame 76 which fits over and snugly receives the base portion of the tooth. The frame 76 overlies the flange 74 and preferably is formed with a peripheral depending lip 78 which depends downwardly across the edge of the flange. Ears 80 at opposite sides of the frame 76 project laterally therefrom and are fastened to the drum by cap screws 66, or the like in the manner hereinabove described.

In the three forms of the invention shown in Figs. 18-26 mounting brackets 42 are employed which are generally similar to the bracket described in connection with the form of the invention shown in Figs. 2-4 except that the lateral flange portions 48 thereof are formed with means which interlock with means on the drum 32 to hold the teeth 30 normally attached to but removable from the drum. In all three forms of the invention, the brackets 42 are embedded in and vulcanized to the teeth 30; but it will be readily apparent that, if desired, they may be bolted, riveted, or similarly fastened to the teeth as shown, for example, in Figs. 7-9.

In the form of the invention shown in Figs. 18-20, the flange portion 48 of each bracket 42 is formed substantially medianly thereof with an upstanding ridge 84, and the drum 32 is formed in the undersurface thereof and at opposite sides of the relatively small openings 56 with laterally extending grooves or channels 86 which receive and interlock with the ridges 84. Both the ridges 84 and the channels or grooves 86 preferably are made by deforming the material of flanges 48 and of the drum 32 by a conventional stamping operation.

In the form of the invention shown in Figs. 21-23, the flanges 48 are formed at the ends thereof with upstanding lugs 88 and the drum 32 is formed at opposite sides of the relatively small opening 56 with lateral recesses 90 which receive and interlock the lugs. It will be observed (Fig. 22) that the lugs 88 fit the inwardly projecting portions of the drum defined by recesses 90 relatively snugly to prevent play or movement between the teeth 30 and the drum 32.

In the form of the invention shown in Figs. 24–26 flanges 48 are formed at the outer edges thereof with upstanding lugs 92 which fit in holes 94 formed in the drum 32 at opposite sides of the relatively small openings 56.

In all three forms of the invention last described, the teeth 30 are applied to and removed from the drum 32 in the manner described in connection with the first form of the invention; viz, to attach the teeth 30 the flanges 48 are inserted under the drum through the relatively large openings 54 and the teeth then pressed downwardly against the drum to disengage the interlocking portions of flanges 48 from the drum and simultaneously pushed circumferentially therealong to position flanges 48 for interlocking engagement with the drum, and to disengage the teeth 30 these operations are reversed.

It is to be understood that the forms of the invention herewith shown and described are to be taken as preferred examples of the same and that various changes in the size, shape and arrangement of parts may be resorted to without departing from the spirit of the invention or the scope of the appended claims.

Having thus described the invention, I claim:

1. In feather-picking apparatus, a rotatable drum, a plurality of rubber feather-picking teeth on the periphery of said drum, and means detachably fastening each tooth separately to the drum, each of said fastening means comprising at least one mounting bracket fastened to the base portion of each tooth and each of said mounting brackets projecting below the tooth with which it is associated, said projecting portions extending through openings in the drum and provided with lateral flanges, said flanges engageable under said drum at one side of said openings, said openings having relatively large portions through which said flanges can be inserted into the drum and relatively small portions in which the brackets can be inserted to position the flanges for interlocking engagement with the drum; and means interlockingly engaging said flanges to hold the same normally in the relatively small portions of said openings.

2. In feather-picking apparatus, a rotatable drum having peripheral openings therein, a plurality of rubber feather-picking teeth on the periphery of said drum, and means detachably fastening each tooth separately to the drum, said fastening means comprising mounting brackets fastened to the base portions of the teeth and the mentioned openings in the drum, one opening being provided for each of said teeth, each of said mounting brackets projecting below the tooth with which it is associated, said projecting portion extending through a respective one of the openings in the drum and provided with a lateral flange and said flange engageable under said drum at one side of said opening, each of said openings having a relatively large portion through which said flange can be inserted into the drum and a relatively small portion in which the bracket can be positioned to engage the flange under the drum, and tab portions on the drum between the relatively large and the relatively small portions of said openings, said tabs extending downwardly into the drum and forming abutment means which engage the flanges of said brackets to hold the same normally in the relatively small portion of said openings, said parts so constructed and arranged that the base portions of the tooth must be compressed against the drum to pass said flange portions over said abutments and that the resilient action of the compressed tooth holds the flange portion pressed solidly upwardly against the drum.

3. In feather-picking apparatus, a rotatable drum having peripheral openings therein, a plurality of rubber feather-picking teeth on the periphery of said drum, and means detachably fastening each tooth separately to the drum, said fastening means comprising mounting brackets fastened to the base portions of the teeth and the mentioned openings in the drum, one opening being provided for each of said teeth, each of said mounting brackets projecting below the tooth with which it is associated, said projecting portion extending through a respective one of the openings in the drum and provided with a lateral flange disposed to engage under said drum at one side of said opening, each of said openings having a relatively large portion through which said flange portion can be inserted into the drum and a relatively small portion in which the bracket is positioned to retain the tooth on the drum, portions of the drum intermediate the relatively small and the relatively large portions of the openings provided with projections which extend angularly downwardly and away from the relatively small portions of said openings, said projections defining shoulders which engage the mounting brackets to hold the same normally in the relatively small portions of said openings.

JOSEPH A. GALAMB.

REFERENCES CITED

The following references are of record in the file of this patent:

UNITED STATES PATENTS

| Number | Name | Date |
|---|---|---|
| 2,096,319 | Churchill | Oct. 19, 1937 |
| 2,337,201 | Johnson | Dec. 21, 1943 |
| 2,342,013 | Sandlin | Feb. 15, 1944 |